United States Patent [19]

Lane et al.

[11] Patent Number: 4,615,421

[45] Date of Patent: Oct. 7, 1986

[54] ELECTRO-MECHANICAL SHIFTER FOR HYDRAULIC TRANSMISSION

[75] Inventors: E. James Lane, Highland, Mich.; Paul L. Speelman, Fredericksburg, Ohio

[73] Assignee: Eaton Corporation, Cleveland, Ohio

[21] Appl. No.: 714,321

[22] Filed: Mar. 21, 1985

[51] Int. Cl.$^4$ ............................................. B60K 41/22
[52] U.S. Cl. ..................... 192/3.54; 192/3.62; 74/867; 74/473 R
[58] Field of Search ............... 192/3.51, 3.52, 3.54, 192/3.55, 3.58, 3.61, 3.62, 3.63; 74/473 R, 867, 856, 878, 866, 745

[56] References Cited

U.S. PATENT DOCUMENTS

| | | | |
|---|---|---|---|
| 2,892,358 | 6/1959 | Backus et al. | 74/745 |
| 3,570,636 | 3/1971 | Franz et al. | 192/3.57 |
| 3,805,640 | 4/1974 | Schneider et al. | 74/365 |
| 4,015,488 | 4/1977 | Akeson et al. | 74/866 |
| 4,034,627 | 7/1977 | Mizote | 74/866 |
| 4,338,832 | 7/1982 | Pelligrino | 74/867 |
| 4,373,619 | 2/1983 | Schritt et al. | 74/866 |
| 4,388,843 | 6/1983 | Teeter | 74/878 |
| 4,442,730 | 4/1984 | Snoy | 192/3.58 |
| 4,476,748 | 10/1984 | Morscheck | 74/867 |
| 4,519,266 | 5/1985 | Reinecke | 74/473 R |

FOREIGN PATENT DOCUMENTS

| | | | |
|---|---|---|---|
| 2019509 | 10/1979 | United Kingdom | 74/878 |
| 2035480 | 6/1980 | United Kingdom | 74/867 |

Primary Examiner—Lawrence Staab
Assistant Examiner—Martin G. Belisario
Attorney, Agent, or Firm—C. H. Grace; A. E. Chrow

[57] ABSTRACT

An electro-mechanical shifter (80) for use with a hydraulic transmission (62) of the type employing a clutch and having first and second valve members (C, D) that in the same and opposite open and closed conditions provide at least one range of gear ratios for driving an output member such as an engine drive shaft (64). Shifter (80) includes a control arm (9) positionable by an operator along a frame (10) that includes a pin (24) operated by an actuator (32) which extends into an arcuate cam opening (22) in frame (10) operative to prevent arm (9) from being moved from a highest gear ratio of a first range of gear ratios beyond a lowest gear ratio of a second range of gear ratios without disengagement of the clutch.

14 Claims, 5 Drawing Figures

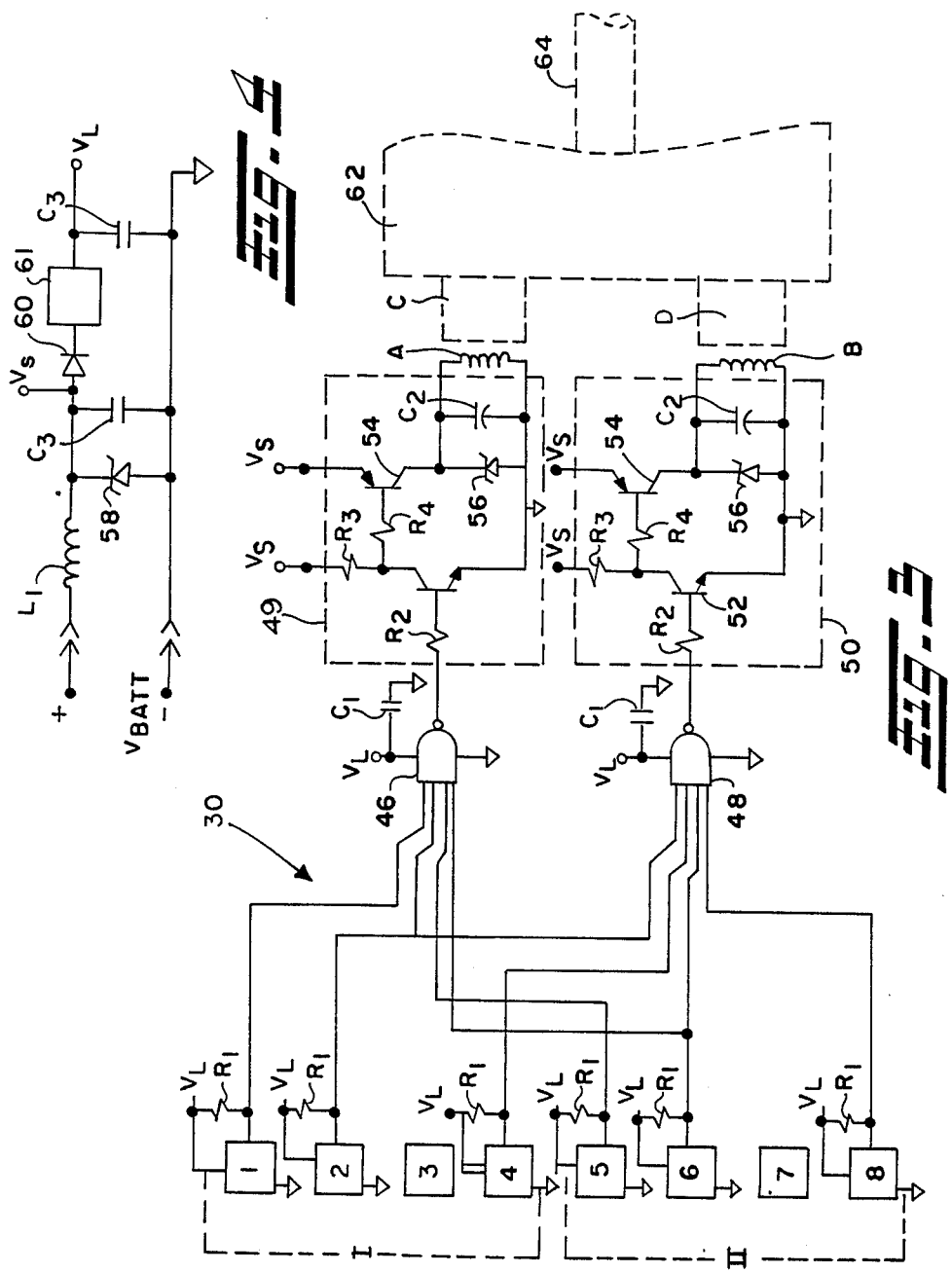

ELECTRO-MECHANICAL SHIFTER FOR HYDRAULIC TRANSMISSION

INTRODUCTION

This invention relates generally to an electro-mechanical shifter for a hydraulic transmission and more particularly to a hydraulic transmission of the type having a pair of valves controlled by the shifter whose relative open and closed condition determine particular gear ratios corresponding to the particular gear position at which the shifter is positioned by an operator and even more particularly where the transmission includes clutching requirements.

BACKGROUND OF THE INVENTION

Hydraulic transmissions utilizing relative open and closed conditions of a pair of valves to establish a particular gear ratio within a range of gear ratios available from a hydraulic transmission for applying different torques for example for rotatably driving the drive shaft, of a motor vehicle are well known.

The valves are generally ported and feature displacements such that when both are closed or open or one is closed and the other is open or vice versa a particular gear ratio is established for each condition by means of hydraulic actuation and deactuation of various clutches contained within the transmission.

Although the relative position of such valves have in the past been controlled mechanically by various shift mechanisms or hydraulically to provide a completely automatic transmission such as disclosed for example in U.S. Pat. No. 4,467,675, a need has existed to provide an electrical interface between the valves and the mechanical components of the shifter to provide the operator with improved feel for the various gear positions yet enable the operator to shift from one gear position to another in a smooth and responsive manner by means of a mechanical component and electrical interface that is simple in its design and economical to manufacture.

In addition to the hereinbefore described need for an economical electro-mechanical shifter for a hydraulic tranmission of the two controlling valve type, there exists a need to provide electro-mechanical shifting for a hydraulic transmission having a clutching requirement for changing back and forth between separate groups of gear ratio ranges as well as provide interlocking clutch restrictions on movement of the shifter between such groups of gear ratio ranges to provide protection to the gear train involved in the transmission as well as the output shaft for example of a motor vehicle being driven by the transmission from undue shock and torque load changes.

SUMMARY OF THE INVENTION

Accordingly, it is an object of this invention to provide an electro-mechanical shifter for a hydraulic transmission of the two control valve type that provides smooth and responsive shifting between gear positions.

It is another object of this invention to provide an electro-mechanical shifter for a hydraulic transmission of the two control valve type that is simple and economical to manufacture.

It is still another object of this invention to provide an electro-mechanical shifter for a hydraulic transmission of the two control valve type that includes clutching requirements.

It is also an object of this invention to provide an electro-mechanical shifter for a hydraulic transmission of the two control valve type that includes clutch interlock restrictions on movement of the shifter between groups of gear ratio ranges as a means of protecting the transmission gear train as well as any output shaft driven by the transmission from undue shock and torque load changes.

DESCRIPTION OF THE DRAWINGS

FIG. 3 shows a plan schematic view of electrical circuitry used in conjunction with the electro-mechanical shifter of FIGS. 1 and 2 and its relationship with a hydraulic tranmission 62 driving output shaft 64 and having first controlling valve C and second controlling valve D;

FIG. 4 shows a schematic of a preferred source of electrical power for use with electrical components of FIGS. 1 and 2 and electrical circuitry of FIG. 3;

DESCRIPTION OF THE PREFERRED EMBODIMENT

Figures 1, 2:
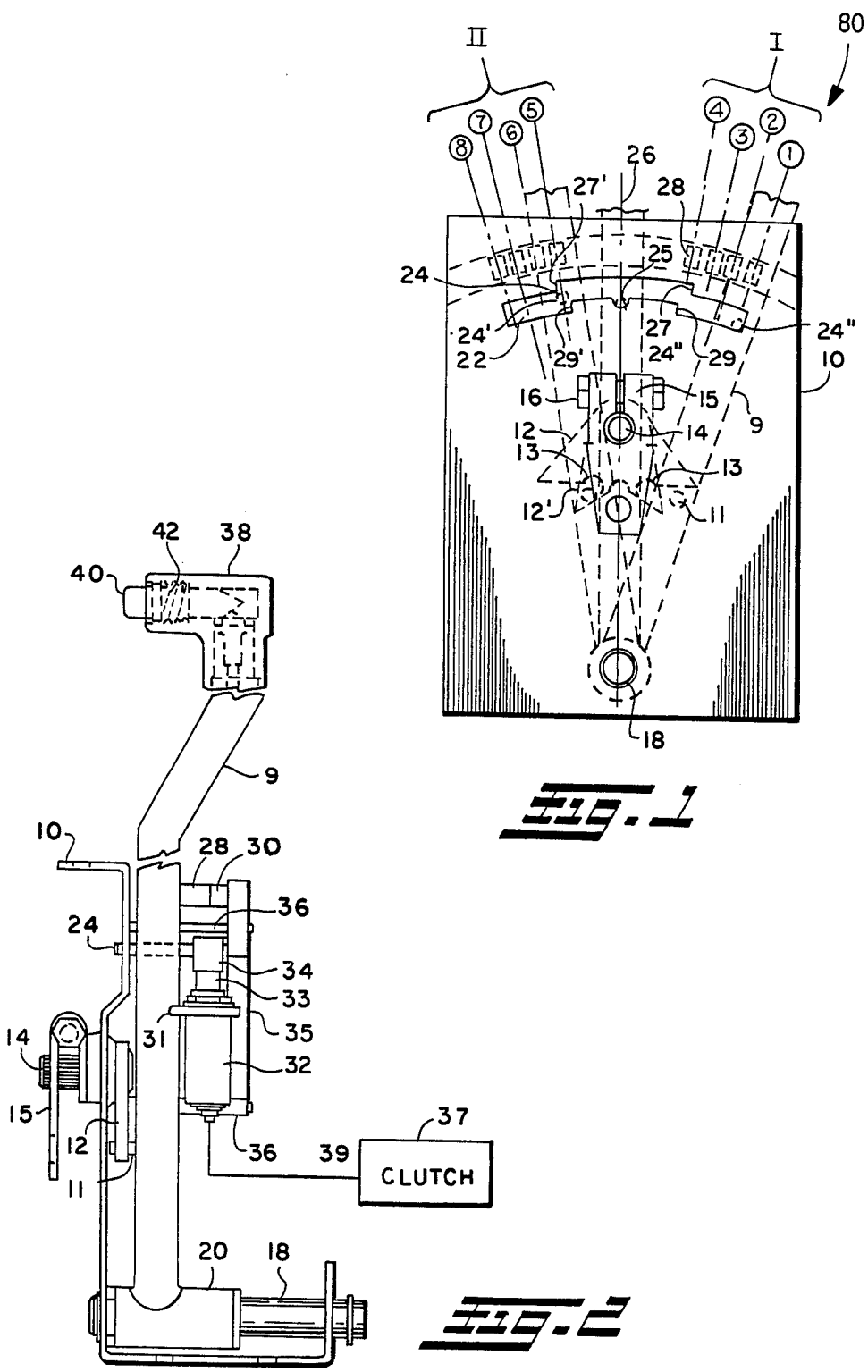
FIG. 1 shows a front elevation view of mechanical and electrical components of an embodiment of an electro-mechanical shifter 80 made in accordance with the invention.
FIG. 2 shows a right side elevation view of the electro-mechanical shifter 80 of FIG. 1.

FIGS. 1 and 2 respectively show front and right side elevation views of an electro-mechanical shifter 80 made in accordance with the invention. Shifter 80 has a control arm 9 that is positionable along frame 10 into a plurality of gear positions 1 through 8 as shown in FIG. 1. In FIG. 1, control arm 9 is partially shown in dashed line positions at gear positions 1 and 5 and in an intermediate position 26 not corresponding to a particular gear position.

Arm 9 is preferably pivotably mounted to frame 10 such as, for example, by being fixedly secured to journal 20 that is rotatably mounted on shaft 18 that itself is mounted in spaced-apart aligned openings (not referenced) in frame 10 as shown in FIG. 2. Alternately, journal 20 or other connector may be fixedly secured to shaft 18 and shaft 18 permitted to rotate to enable movement of arm 9 or other suitable mounting of arm 9 may be be used to provide relative movement with respect to frame 10.

Control arm 9 is provided with a handle 38 which can be gripped by an operator making it convenient for the operator to move arm 9 in opposite directions along frame 10 and rotatably about shaft 18 to the various gear positions 1–8 shown in FIG. 1.

Gear positions 1–8 represent a plurality of gear positions divided into two groups of four for which hydraulic transmission 62 of FIG. 3, depending upon its design, is able to provide either a single range of gear ratios without a clutching requirement or require engagement of a clutch when shifting between the groups for providing a variable torque for driving shaft 64 of FIG. 3 which may, for example, be the drive shaft of a motor vehicle.

Selecting one or the other of the two groups of gear ratio ranges of transmission 62 is preferably provided by means of first cam 12 that is pivotably mounted to frame 10 and is caused to rotate to the dashed positions shown in FIG. 1 by means of first pin 11 that extends from control arm 9 and coacts with depression 13 in cam 12 in such a manner that cam 12 is caused to rotate clockwise when control arm 9 is moved towards the viewer's left in FIG. 1 and counterclockwise when control arm 9 is moved from left to right as viewed in FIG. 1.

Cam 12 is secured to serrated shaft 14 by means of bolt 16 as shown in FIG. 2 and rotation of cam 12 in opposite directions causes serrated shaft 14 to rotate plate 15 which in turn is operably coupled to a universal gear of transmission 62 (not shown) that when positioned into a first condition by movement of arm 9 from Group II to Group I provides a first gear ratio range and when positioned into a second condition by movement of arm 9 from Group I to Group II provides a second gear ratio range.

In the case where transmission 62 requires disengagement of a clutch in order to move control arm 9 between separate groups of gear ratio ranges, shifter 80 includes clutch interlocking means operable to control the manner in which arm 9 is able to be moved between the groups. Such interlocking means is adapted to enable arm 9 to be moved for example between gear positions 1-4 of Group I without disengaging the clutch and to move from position 4 of Group I to position 5 of Group II upon disengagement of the clutch by the operator and to move between positions 5-8 upon subsequent engagement of the clutch by the operator where position 4 is the highest gear ratio position of Group I and position 5 is the lowest gear ratio position of Group II. The clutch interlocking means may additionally be adapted to prevent arm 9 from being moved from gear position 4 to any gear position other than gear position 5 in Group II and from gear position 5 to any gear position other than position 4 in Group I while the clutch is disengaged.

Preferably, the clutch interlocking means is provided by coaction between a cam means and pin 24. The cam means comprises an arcuate profiled cam opening 22 in frame 10 as shown in FIG. 1 that is disposed in a plane generally parallel to the plane of movement of arm 9. Pin 24 is operatively connected to solenoid 32 and extends through opening 22. Solenoid 32 is preferably mounted on arm 9 by means of welding or other suitable means of securement generally referenced as 31 in FIG. 2. As mounted, solenoid 32 and pin 24 are carried by arm 9 as it is moved between Groups I and II.

Solenoid 32 is provided with a moveable core member 33 that is operatively coupled with pin 24 by coupling 34 that causes pin 24 to move upwardly and downwardly within cam opening 22 upon corresponding upward and downward movement of core 33. Pin 24 may be operatively connected to core 33 by suitable linkage or it may be an extension of core 33. Pin 24 is normally in an extended condition through opening 22 and movement of pin 24 is controlled through solenoid 32 by the nature of an electrical signal 39 provided by clutch 37. The means by which solenoid 32 is able to receive signal 39 may be any suitable means of providing an electrical signal to a solenoid, and, since solenoid 32 in the preferred embodiment is mounted for movement with arm 9, such means would include a wiping electrical contact (not referenced) secured to arm 9 that maintains electrical contact with electrical contact (not referenced) secured to back plate 35 which in turn is secured to frame 10 by means of spaced-apart pins 36.

Various positions of pin 24 within cam opening 22 are shown in FIG. 1. When the clutch is engaged, pin 24 is in its most downward position referenced as 24" resting against a bottom edge of cam opening 22 as shown in FIG. 1. When the clutch is disengaged, pin 24 is in its most upward position referenced as 24 resting against an upper edge of cam opening 22 as shown in FIG. 1. The upper edge of cam opening 22 is provided with spaced-apart stops 27 and 27' and the bottom edge of cam opening 22 is provided with spaced-apart stops 29 and 29'. The bottom edge of cam opening 22 is preferably further provided with depression 25 located at intermediate location line referenced as 26 in FIG. 1. Depression 25 is useful for example to lock arm 9 in a neutral position between Groups I and II in the event the operator engages the clutch while control arm 9 is in the intermediate region between Groups I and II.

In operation, pin 24 is in its lowest position with the clutch engaged and arm 9 is able to be moved between positions 1 and 4 of Group I but is prevented from being moved to position 5 of Group II by reason of pin 24 coming against stop 29. Disengagement of the clutch provides electrical signal 39 to solenoid 32 which causes pin 24 to move to its most upward position enabling arm 9 to be moved to position 5 of Group II but no further due to pin 24 coming against stop 27'. Engagement of the clutch causes solenoid 32 to lower pin 24 to its lowest position enabling arm 9 to be moved between positions 5-8 but which prevents arm 9 from being moved from position 5 of Group II to position 4 of Group I due to pin 24 coming against stop 29' without disengagement of the clutch. Position 4 represents the highest gear ratio position of Group I and position 5 represents the lowest gear ratio position of Group II. As earlier described, depression 25 provides an intermediate locking position for arm 9 between Groups I and II into which pin 24 can be positioned by engaging the clutch in the intermediate region between Groups I and II.

The shifter of the invention preferably includes operator controlled means for overriding the clutch interlocking means previously described. Such overriding means is preferably provided by the operator being able to position pin 24 in an intermediate position referenced as 24' in FIG. 1. Preferably, such is provided by means of button 40 in handle 38 of arm 9. Button 40 is urged outwardly from handle 38 by suitable biasing means such as spring 42 shown in FIG. 2. Button 40 is operable upon depression by an operator to provide an electrical signal that causes solenoid 32 to move pin 24 to its intermediate position referenced as 24' or is adapted to mechanically move pin 24 to its intermediate position referenced as 24'. In such intermediate position within opening 22, there are no stops to restrict movement of arm 9 and arm 9 is able to be moved between Groups I and II without disengagement of the clutch.

A preferred embodiment of the electrical interface between the mechanical components of shifter 80 hereinbefore described and the transmission being controlled thereby is hereinafter described with respect to FIGS. 3 and 4.

Shifter 80 is provided with means for generating an electrical triggering signal at three of the four gear positions of Groups I and II. Although any suitable means of generating the triggering signal may be employed, it is preferably generated by means a proximity sensor arrangement comprising a magnet 28 secured to arm 9 having a magnetic field that is sufficient to be sensed by a hall effect magnetic field sensor 30 secured to frame 10 at each gear position at which is is desired to generate a triggering signal as shown in FIGS. 1 and 2. Sensor 30 is secured to frame 10 by means of support plate 35 that is secured to frame 10 by pins 36 as shown in FIG. 2.

Each sensor 30 is connectable to an electrical power source $V_L$ as shown in FIG. 3 and provides the triggering signal when the magnetic field of magnet 28 is bought into proximity to sensor 30 at each gear position where a sensor 30 is secured. The preferred associated electrical interface circuitry of shifter 80 for controlling transmisson 62 is shown in FIGS. 3 and 4. In FIG. 3, gear positions 1, 2 and 4 of Group I and 5, 6 and 8 of Group II are provided with hall effect sensors 30 connectable to an electrical power source $V_L$. Gear position 3 of Group I and gear position 7 of Group II are not provided with hall effect generators 30 so that no triggering signal is generated when arm 9 is positioned thereat.

The relative "open" and "closed" relationship of first valve C and second valve D of transmission 62 determines the gear ratio corresponding to each particular gear position of arm 9 as previously described. Valves C and D are actuated by means of respective actuators A and B when one or the other or both receive an actuating signal. Actuators A and B are preferably electrical solenoids that both operate to either open or close valves C and D upon receipt of the actuating signal.

The actuating signal for actuator A is provided by first actuating signal circuit 49 connectable thereto and the actuating signal for actuator B is provided by second actuating signal circuit 50 connectable thereto as shown in FIG. 3. Circuit 49 is connectable to an electrical power source $V_s$ and to first electrical gate means 46 and operates to provide the actuating signal upon receipt of an electrical output signal from gate 46. Circuit 50 is connectable to an electrical power source $V_s$ and to second electrical gate means 48 and operates to provide the actuating signal upon receipt of an electrical output signal from gate 48.

Gate means 46 and 48 are connectable to a suitable electrical power source $V_L$ as shown in FIG. 3. Gate means 46 and 48 are preferably "nand" gates which, in reponse to receipt of input signals, provides an output signal well known to those skilled in the art. Although the use of "nand" gates is preferred, it is to be understood that the use of "and" gates with appropriate correction to the circuitry is included within the scope of the invention.

Gate means 46 and 48 are connectable jointly and separately to sensors 30 at gear positions 1, 2 and 4 of Group I and gear positions 5, 6 and 8 of Group II preferably in the manner shown in FIG. 3.

Figure 5:
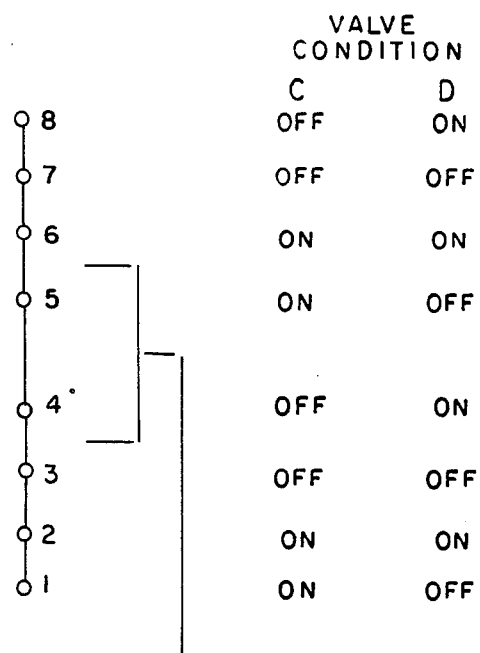
FIG. 5 shows a schematic of a plurality of gear positions of electro-mechanical shifter 80 of FIGS. 1, 2 and 3 and the particular "on" or "off" condition of valves C and D of transmission 62 of FIG. 3.

Arrangement according to the pattern shown in FIG. 3 results in relative "on" and "off" conditions of valves C and D shown in FIG. 5. Thus, for example, when arm 9 is moved to give position 1, magnet 28 causes sensor 30 at that position to send a triggering signal to gate 46 but not gate 48 and only gate 46 provides an output signal to circuit 48 which in turn provides an actuating signal to actuator A which actuates to open valve C but not valve D. It will be noted that, since gear positions 3 and 7 are devoid of sensors 30, no triggering signal is generated and in such condition both valves C and D are in the "off" condition.

A preferred source of electrical power from a battery such as a 12 volt battery of a motor vehicle for which shifter 80 is used is shown in FIG. 4.

Although other sources of electrical power may be used for operation of shifter 80, preferably the source from such as a battery provides a "$V_s$" voltage that is greater than the $V_L$ voltage previously described by means of the circuitry shown in FIG. 4.

Particularly preferred ratings for electrical components shown in FIG. 3 for use in conjunction with a 12 volt battery for powering shifter 80 are described in following Table I.

TABLE I

| COMPONENT | RATING |
| --- | --- |
| Resistor $R_1$ | 4.7K ohms |
| Resistor $R_2$ | 4.7K ohms |
| Resistor $R_3$ | 2.0K ohms |
| Resistor $R_4$ | 120.0 ohms |
| Capacitor $C_1$ | .01 micro-farads |
| Capacitor $C_2$ | .01 micro-farads |
| Capacitor $C_3$ | 10.0 micro-farads |
| Inductance $L_1$ | 4.0 micro-henrys |

In addition to the above, in FIG. 3, 52 and 54 are suitable transistors and 56 and 58 are suitable zener diodes. In FIG. 4, 60 is a suitable diode and 61 is a suitable voltage regulator. It can readily be seen that the electrical signal generation means, the first and second actuator means, and the electrical circuitry means hereinbefore described is equally applicable for use with automatic hydraulic transmissions having no clutching requirement for moving between a plurality of gear positions as well as for use with hydraulic transmissions having a clutch engagement requirement between separate groups of gear ratio ranges.

The shifter of the invention may also be used for hydraulic transmissions having an overdrive which, when engaged, provides a second range of gear ratios for single and dual gear ratio range transmissions. Thus, for example, the dual range of gear position hydraulic transmissions described herein of the two valve type may provide for up to sixteen gear ratios depending on the use of universal gearing and/or overdrive as previously described.

What is claimed is:

1. An electro-mechanical shifter for a hydraulic transmission of the type having first and second control valve means that in the same and opposite open and closed conditions enable the transmission to provide a range of gear ratios for driving an output member and including clutch means that, upon disengagement, disengages the transmission therefrom, said shifter comprising:

a control arm carrying a second pin member positionable by an operator along a frame into a plurality of gear positions respectively included within separate first and second gear ratio range groups having a lowest and a highest gear ratio position within each of said groups;

electrical signal generation means connectable to an electrical power source and operable to provide an electrical triggering signal upon positioning said control arm at each of said gear positions within said first and second groups;

first actuator means operably connected to said first valve means and second actuator means operably connected to said second valve means, said first and second actuator means operable to open and close said valve means respectively connected thereto according to whether an electrical actuating signal is received thereby;

electrical circuit means operable to receive said triggering signal and to provide said actuating signal to either or both said first and second valve means according to the particular gear position at which said control arm is positioned; and clutch interlocking means comprising a cam opening in said frame that is substantially parallel to the plane of movement of said control arm with said second pin member extending through said opening that is moveable by an actuator carried by the control arm, said opening having spaced-apart upper and lower edges profiled to provide said interlocking means and said actuator operable upon receipt of an electrical signal provided upon disengagement of said clutch means to correspondly move said second pin member upwardly and downwardly against said spaced-apart edges to provide said clutch interlocking means.

2. The shifter of claim 1 including at least one gear position devoid of said signal generation means so that neither said first and said second actuator means receives said actuating signal when the control arm is positioned thereat.

3. The shifter of claim 1 wherein said electrical circuit means includes first actuating signal electrical circuit means connectable to said first actuator means and second actuating signal electrical circuit means connectable to said second actuator means, said first and second actuator means respectively connectable to an electrical power source and operable to provide said atuating signal respectively to said actuator means connectable thereto in response to receipt thereby of an electrical output signal to provide an output signal combination therefrom corresponding to the particular gear position selected by the operator, and first electrical gate means connectable to said first actuating signal circuit means and second electrical gate means connectable to said second actuating signal circuit means, said first and second gate means operable to provide said output signal and respectively connectable to an electrical power source and jointly or separately to said signal generation means in such a manner that either one or both of said first and second gate means receive said triggering signal to provide said output signal combintion therefrom corresponding to the particular gear position selected by the operator.

4. The shifter of claims 3 wherein the electrical power source comprises a first controlled electrical power source connectable to said signal generation means and to said first and second electrical gate means and a second controlled power source connectable to said first and second actuating signal circuit means.

5. The shifter of claim 3 wherein said first and second gate means respectively comprise first and second nand gate means.

6. The shifter of claim 1 wherein the transmission includes means enabling movement of the control arm to provide said first and second gear ratio range groups.

7. The shifter of claim 6 wherein the means for providing said first and second gear ratio range groups comprises a synchronous gear operably coupled with the transmission and positionable into a first condition to provide said first gear ratio range group and into a second condition to provide said second gear ratio range group and means is included enabling the control arm to automatically position said synchronous gear into said first condition when the control arm is moved to said first group from said second group and position said synchronous gear in said second condition when the control arm is moved to said second group from said first group.

8. The shifter of claim 7 wherein the means automatically enabling the control arm to position said synchronous gear into said first and second conditions comprises the combination of a first pin extending from the arm and a first cam operably connected to said synchronous gear, said pin and cam coacting in such a manner that the pin urges the cam in one direction which in turn positions said synchronous gear in said first condition when the control arm is moved in one direction from said second group to said first group and urges the cam in an opposite direction which in turn positions said synchronous gear in said second condition when the control arm is moved in an opposite direction from said first group to said second group.

9. The shifter of claim 8 wherein the cam is pivotably mounted and coacts with said pin in such a manner that said pin rotates the cam in said one direction when the arm is moved from said first group to said second group and rotates the cam in said opposite direction when the arm is moved from said second group to said first group.

10. The shifter of claim 1 including operator controllable override means enabling the operator to override said clutch interlocking means and enable the control arm to be moved between said first and second gear ratio range groups without disengagement of the clutch means.

11. The shifter of claim 10 wherein said override means comprises a depressable button carried by said control arm and operable upon depression by the operator to move said pin member to an intermediate position between said spaced-apart cam edges.

12. The shifter of claims 1 wherein said first and second actuator means respectively comprise first and second solenoid means.

13. The shifter of claim 1 wherein said control arm actuator comprises an electrical solenoid.

14. The shifter of claims 1 wherein the signal generation means for providing the triggering signal comprises a magnet secured to said control arm and a hall effect magnetic field sensor secured to the frame at each of said gear positions from which it is desired to provide said triggering signal, said magnet having a magnetic field sufficient to cause said sensor to provide said triggering signal when said magnet is brought into proximity thereto when said arm is positioned at each of said gear positions by the operator.

* * * * *